(12) United States Patent
Liu et al.

(10) Patent No.: US 9,965,676 B2
(45) Date of Patent: May 8, 2018

(54) METHOD AND SYSTEM FOR IDENTIFYING A PLURALITY OF REFERENCE POINTS IN A HAND DRAWING TRACK

(71) Applicant: Zeng Hsing Industrial Co., Ltd., Taichung (TW)

(72) Inventors: Zhen-Yu Liu, Taichung (TW); Jia-Hui You, Taichung (TW)

(73) Assignee: Zeng Hsing Industrial Co., Ltd., Taichung (TW)

( * ) Notice: Subject to any disclaimer, the term of this patent is extended or adjusted under 35 U.S.C. 154(b) by 163 days.

(21) Appl. No.: 15/083,435

(22) Filed: Mar. 29, 2016

(65) Prior Publication Data

US 2017/0083761 A1    Mar. 23, 2017

(30) Foreign Application Priority Data

Sep. 21, 2015  (TW) .............................. 104131156 A

(51) Int. Cl.
| | | |
|---|---|---|
| *G06K 9/00* | (2006.01) | |
| *G06T 11/20* | (2006.01) | |
| *D05B 19/00* | (2006.01) | |
| *D05B 19/08* | (2006.01) | |
| G06F 3/0488 | (2013.01) | |
| G06F 3/0484 | (2013.01) | |

(52) U.S. Cl.
CPC ....... *G06K 9/00416* (2013.01); *D05B 19/006* (2013.01); *D05B 19/08* (2013.01); *G06T 11/203* (2013.01); *G06F 3/04845* (2013.01); *G06F 3/04883* (2013.01)

(58) Field of Classification Search
CPC .......... G06K 9/00402; G06K 9/00409; G06K 9/00416; G06K 9/4604; G06K 9/48; G06T 7/10; G06T 7/149; G06T 7/181; G06T 7/543; G06T 11/203; G06F 3/04883; D05B 19/08; D05C 5/04; D05C 5/06

See application file for complete search history.

(56) References Cited

U.S. PATENT DOCUMENTS

| | | | | |
|---|---|---|---|---|
| 5,638,462 | A * | 6/1997 | Shirakawa | .................... 382/186 |
| 5,926,567 | A * | 7/1999 | Collins et al. | ................ 382/187 |
| 8,014,630 | B1 * | 9/2011 | Polyakov et al. | ............ 382/282 |
| 2002/0150297 | A1 * | 10/2002 | Gorbatov et al. | ............ 382/202 |
| 2012/0050293 | A1 * | 3/2012 | Carlhian et al. | .............. 345/442 |

* cited by examiner

*Primary Examiner* — Andrew W Johns

(74) *Attorney, Agent, or Firm* — Trop Pruner & Hu, P.C.

(57) ABSTRACT

A method for identifying reference points in a hand drawing track with a number (n) of dots includes marking a first one of the dots as a reference point; for each of a ($k^{th}$) one of the dots, determining an included angle; marking the ($k^{th}$) one of the dots as a reference point when the included angle associated therewith is larger than a predetermined angle; calculating an accumulated distance between the ($k^{th}$) one of the dots and a last one of the reference point (s) thus marked when the included angle is not larger than the predetermined angle; and marking the ($k^{th}$) one of the dots as a reference point when it is determined that the accumulated distance thus calculated is larger than the predetermined distance, $2 \leq k \leq (n-1)$.

12 Claims, 8 Drawing Sheets

| | |
|---|---|
| $P_1$: (89,189) | $P_{21}$: (114,142) |
| $P_2$: (89,187) | $P_{22}$: (115,145) |
| $P_3$: (90,183) | $P_{23}$: (116,150) |
| $P_4$: (91,179) | $P_{24}$: (118,155) |
| $P_5$: (92,174) | $P_{25}$: (120,158) |
| $P_6$: (94,171) | $P_{26}$: (122,163) |
| $P_7$: (96,166) | $P_{27}$: (123,166) |
| $P_8$: (99,158) | $P_{28}$: (125,170) |
| $P_9$: (101,155) | $P_{29}$: (126,174) |
| $P_{10}$: (103,155) | $P_{30}$: (129,178) |
| $P_{11}$: (105,146) | $P_{31}$: (129,181) |
| $P_{12}$: (106,144) | $P_{32}$: (130,184) |
| $P_{13}$: (107,140) | $P_{33}$: (132,189) |
| $P_{14}$: (109,136) | $P_{34}$: (133,192) |
| $P_{15}$: (110,135) | $P_{35}$: (134,193) |
| $P_{16}$: (110,134) | $P_{36}$: (134,194) |
| $P_{17}$: (111,134) | $P_{37}$: (134,195) |
| $P_{18}$: (112,135) | |
| $P_{19}$: (113,137) | |
| $P_{20}$: (114,139) | | ent of the disclosure;
METHOD AND SYSTEM FOR IDENTIFYING A PLURALITY OF REFERENCE POINTS IN A HAND DRAWING TRACK

CROSS-REFERENCE TO RELATED APPLICATION

This application claims priority of Taiwanese Application No. 104131156, filed on Sep. 21, 2015.

FIELD

The disclosure relates to a method for identifying a plurality of reference points in a hand drawing track.

BACKGROUND

Off-the-shelf software for a sewing machine typically provides functionalities for a user to input a pattern that is to be sewn by the sewing machine. For example, the user may input an image file (via a digital camera, a scanner, the Internet, etc.) that contains the pattern into a sewing machine that executes the software, and the software is capable of converting the image file into a pattern file that is readable by the sewing machine.

SUMMARY

An object of the disclosure is to provide a method that allows a user to design a customized pattern for a sewing machine via hand drawing.

According to the disclosure, a method for identifying a plurality of reference points in a hand drawing track is to be implemented using a system including an interface and a processor. The interface is configured for input of the hand drawing track and for display of the hand drawing track with a number (n) of dots. The method includes:
  determining, by the processor, a first one of the dots and an ($n^{th}$) one of the dots of the hand drawing track, and marking the first one of the dots as a reference point;
  for each of a ($k^{th}$) one of the dots of the hand drawing track, determining, by the processor, a first auxiliary line which is an extension of a line segment interconnecting a ($k-1^{th}$) one of the dots and the ($k^{th}$) one of the dots, a second auxiliary line which is a line segment interconnecting the ($k^{th}$) one of the dots and a ($k+1^{th}$) one of the dots, and an included angle that is associated with the ($k^{th}$) one of the dots and that is defined by the first and second auxiliary lines, where $2 \leq k \leq (n-1)$;
  marking, by the processor, the ($k^{th}$) one of the dots as a reference point when the included angle associated with the one of the dots is larger than a predetermined angle;
  calculating, by the processor, an accumulated distance between the ($k^{th}$) one of the dots and a last one of the reference points thus marked when the included angle associated with the ($k^{th}$) one of the dots is not larger than the predetermined angle;
  by the processor, comparing the accumulated distance thus calculated with a predetermined distance, and marking the ($k^{th}$) one of the dots as a reference point when it is determined that the accumulated distance thus calculated is larger than the predetermined distance; and
  by the processor, marking the ($n^{th}$) one of the dots as a reference point.

Another object of the disclosure is to provide a system that is capable of executing the abovementioned method.

According to the disclosure, the system for identifying a plurality of reference points in a hand drawing track includes an interface and a processor.

The interface is configured for input of the hand drawing track and for display of the hand drawing track with a number (n) of dots.

The processor is coupled to the interface and is programmed to
  determine a first one of the dots and an ($n^{th}$) one of the dots of the hand drawing track, and mark the first one of the dots as a reference point,
  for each of a ($k^{th}$) one of the dots of the hand drawing track, determine a first auxiliary line which is an extension of a line segment interconnecting the ($k-1^{th}$) one of the dots and the ($k^{th}$) one of the dots, a second auxiliary line which is a line segment interconnecting the ($k^{th}$) one of the dots and a ($k+1^{th}$) one of the dots, and an included angle that is associated with the ($k^{th}$) one of the dots and that is defined by the first and second auxiliary lines, where $2 \leq k \leq (n-1)$,
  mark the ($k^{th}$) one of the dots as a reference point when the included angle associated with the ($k^{th}$) one of the dots is larger than a predetermined angle,
  calculate an accumulated distance between the ($k^{th}$) one of the dots and a last one of the reference points thus marked when the included angle associated with the ($k^{th}$) one of the dots is not larger than the predetermined angle,
  compare the accumulated distance thus calculated with a predetermined distance, and mark the ($k^{th}$) one of the dots as a reference point when it is determined that the accumulated distance thus calculated is larger than the predetermined distance, and
  mark the ($n^{th}$) one of the dots as a reference point.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
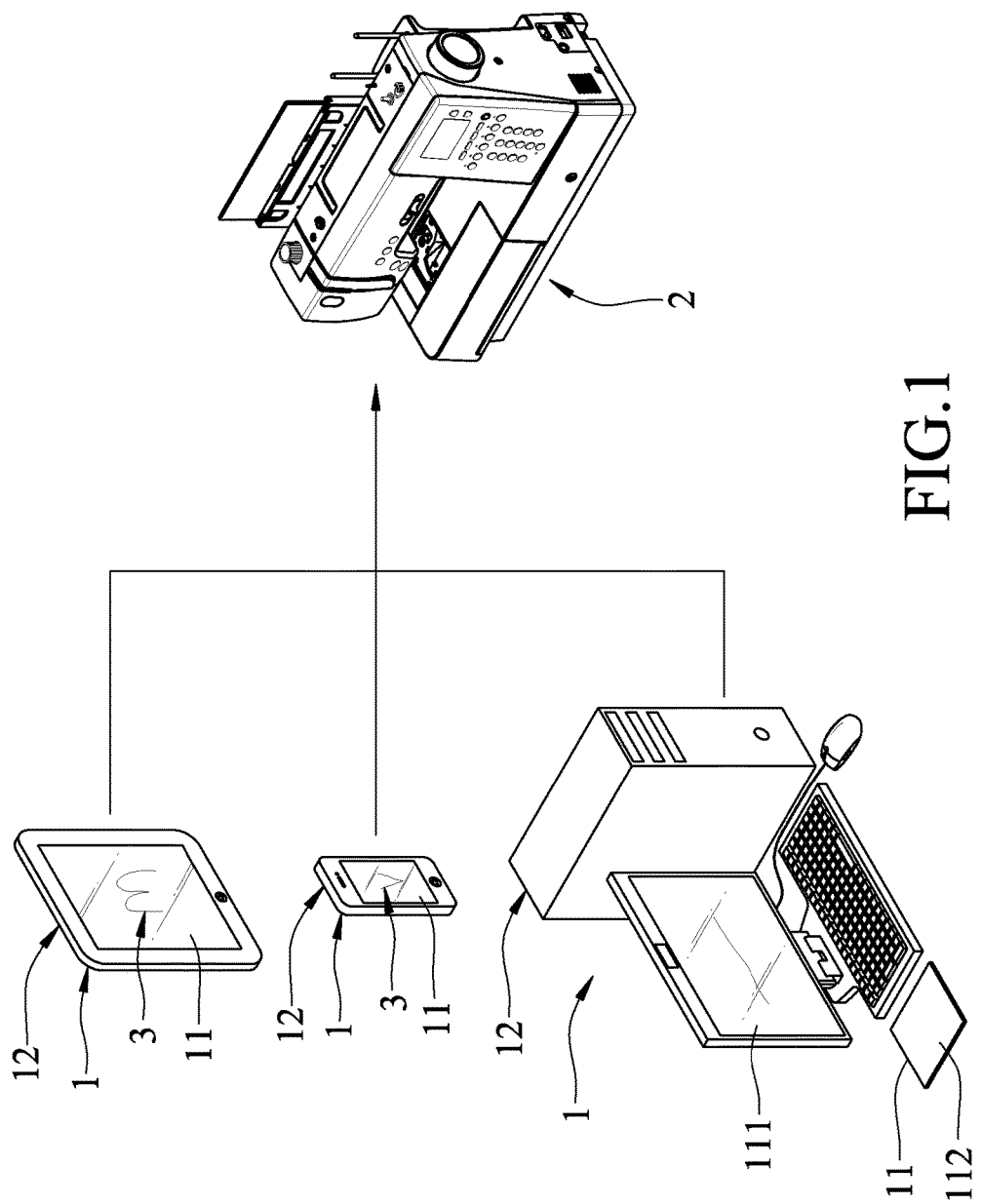
FIG. 1 illustrates a system and a sewing machine according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
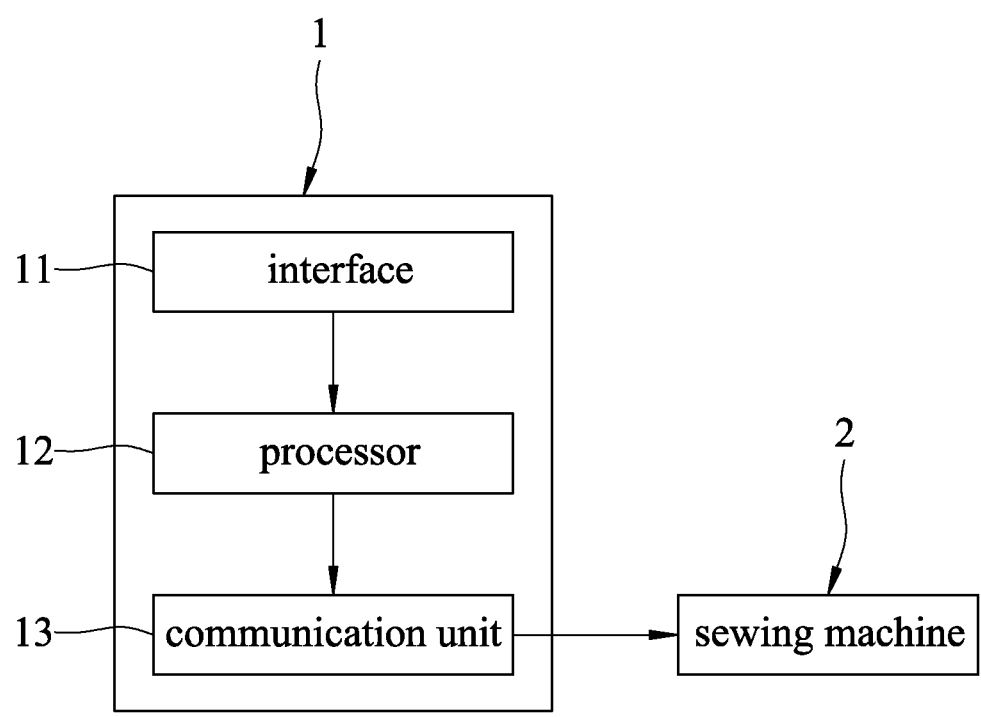
FIG. 2 is a block diagram illustrating components of the system and the sewing machine according to one embodiment of the disclosure.

FIGS. 1 and 2 illustrate a system 1 according to one embodiment of the disclosure. The system 1 includes an interface 11 configured for input of a hand drawing track 3, a processor 12 coupled to the interface 11, and a communication unit 13 coupled to the processor 12 and configured to communicate with a sewing machine 2. In various embodiments, the system 1 may be implemented using a tablet, a portable device (the interface 11 being a touch screen), or a personal computer that includes a graphics tablet 112 for receiving input of the hand drawing track 3, and a display 111 for displaying the hand drawing track 3.

In the embodiments, the processor 12, executing a software application, may generate an instruction for a user to draw the hand drawing track 3 using the interface 11. After the hand drawing track 3 is received by the interface 11, the hand drawing track 3 is displayed by the interface 11 with a number (n) of dots.

Figure 3:
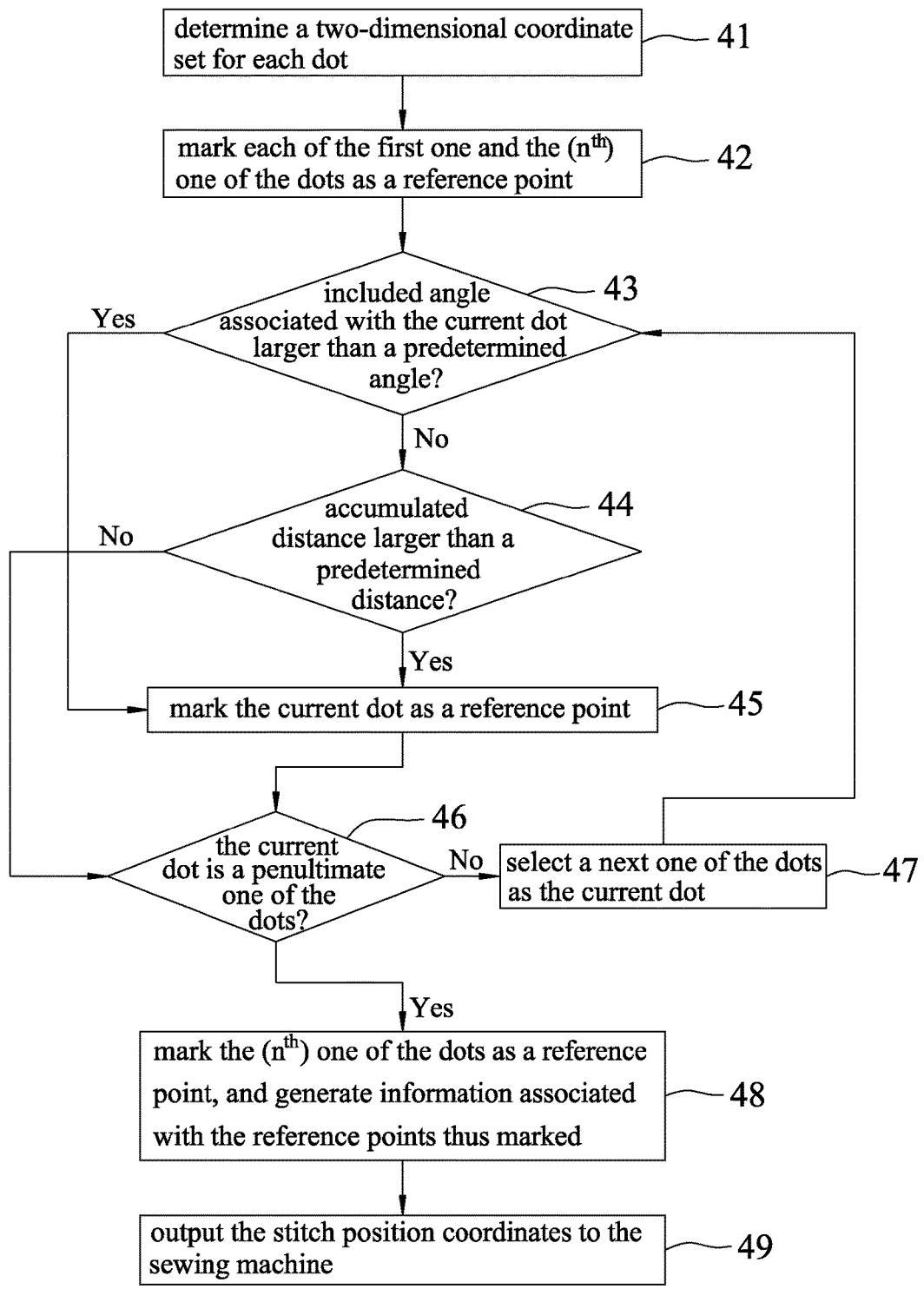
FIG. 3 is a flow chart illustrating steps of a method implemented by the system according to one embodiment of the disclosure.

Referring to FIG. 3, at this stage, the system 1 is ready to execute a method for identifying a plurality of reference points 31 (see FIG. 4) in the hand drawing track 3 for the sewing machine 2 to sew a pattern based on the reference points 31.

In step 41, the processor 12 determines a two-dimensional coordinate set for each of the number (n) of dots of the hand drawing track 3, according to a two-dimensional coordinate system associated with the interface 11.

Figure 4:
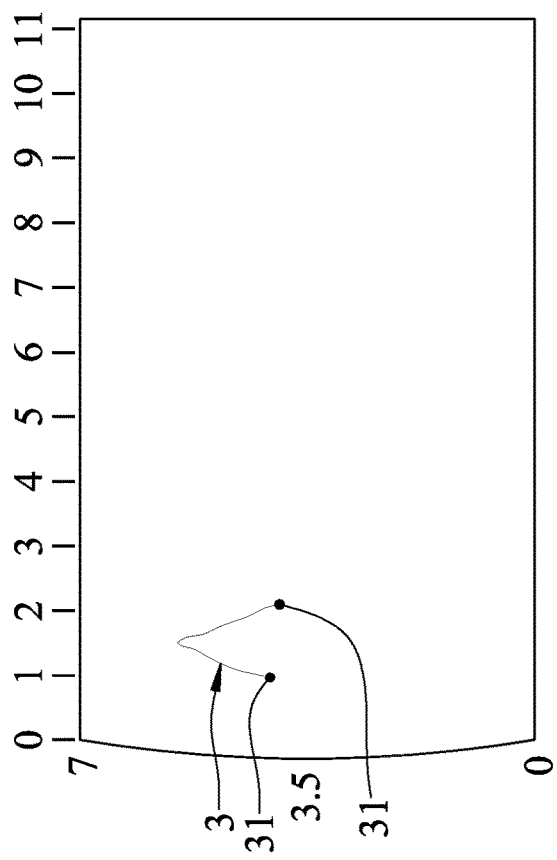
FIG. 4 illustrates a hand drawing track and a list of two-dimensional coordinate sets each corresponding with a respective one dot of the hand drawing track.

Specifically, as shown in FIG. 4, an exemplary hand drawing track 3 may be represented by 37 different dots labeled as ($P_1$) to ($P_{37}$), each having a specific two-dimensional coordinate set as listed.

In step 42, the processor 12 determines a first one of the dots ($P_1$) and an ($n^{th}$) one of the dots (($P_{37}$) for the exemplary hand drawing track 3 depicted in FIG. 4) of the hand drawing track 3, and marks the first one of the dots ($P_1$) as a reference point 31.

Afterward, starting from the second dot ($P_2$), the processor 12 sequentially determines, for each one of the dots ($P_k$) of the hand drawing track 3, whether the hand drawing track 3 experiences a significant turn at the particular dot ($P_k$).

Specifically, in step 43, the processor 12 determines first auxiliary line which is an extension of a line segment interconnecting a (k-1$^{th}$) one of the dots and the (k$^{th}$) one of the dots (referred to as a current dot ($P_k$) hereafter), a second auxiliary line which is a line segment interconnecting the current dot ($P_k$) and a (k+1$^{th}$) one of the dots, and an included angle $\theta_k$ that is associated with the current dot ($P_k$) and that is defined by the first and second auxiliary lines.

Figure 5:
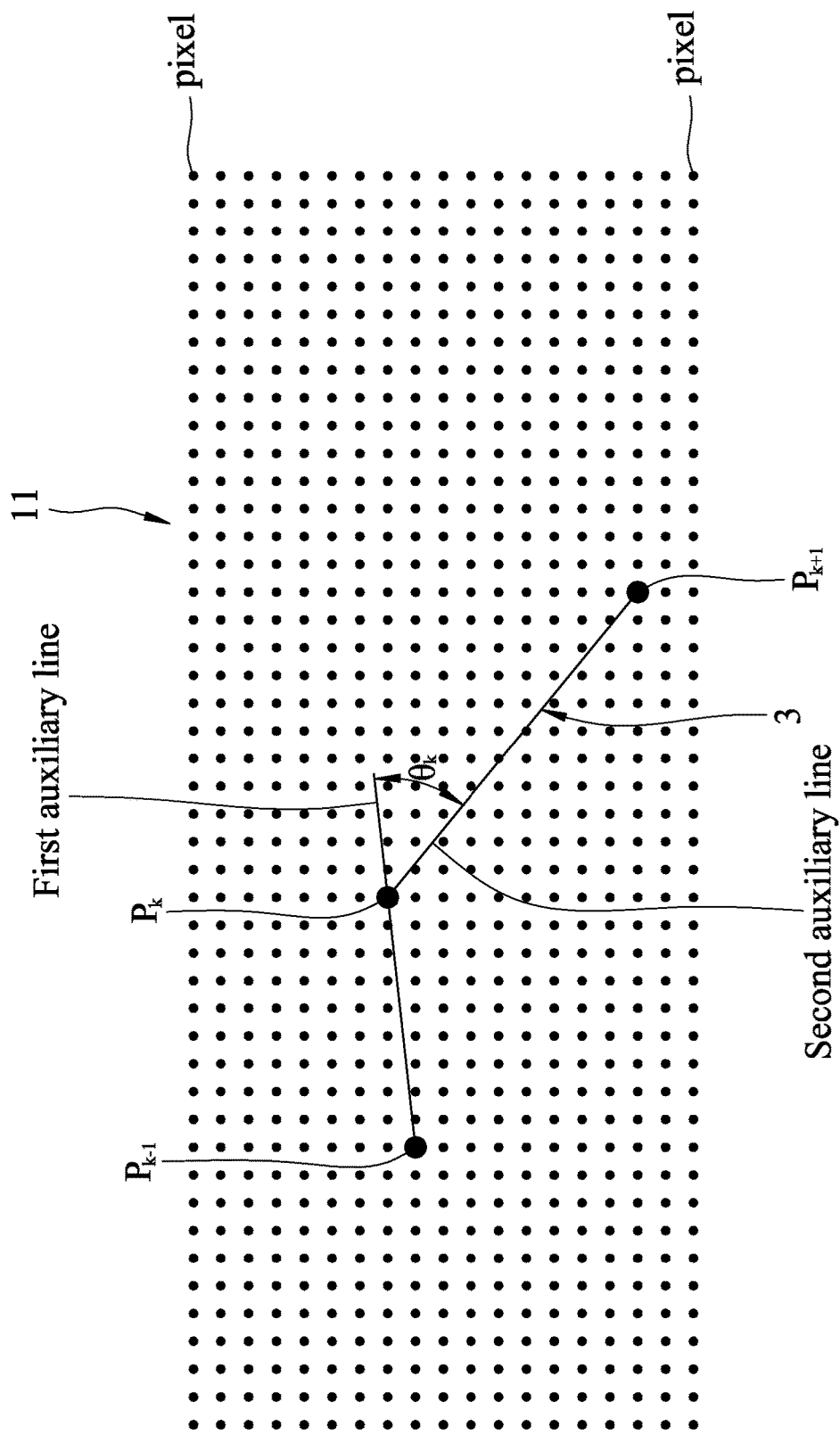
FIGS. 5 and 6 illustrate examples for identifying a plurality of reference points in the hand drawing track, according to one embodiment of the disclosure.

Referring to FIG. 5, for the current dot ($P_k$) of an exemplary hand drawing track 3, the first auxiliary line, the second auxiliary line and the included angle $\theta_k$ are illustrated. In this embodiment, when the included angle associated with the current dot ($P_k$) is larger than a predetermined angle $\theta_0$, the flow proceeds to step 45. Otherwise, the flow proceeds to step 44.

The predetermined angle $\theta_0$ may be selected from an angle ranging from 30 degrees to 60 degrees (e.g., 45 degrees).

In step 44, the processor 12 calculates an accumulated distance (d) between the current dot ($P_k$) and a last one of the reference points 31 thus marked and determines whether the accumulated distance (d) thus calculated is larger than a predetermined distance (D).

When it is determined that the accumulated distance (d) thus calculated is larger than the predetermined distance (D), the flow proceeds to step 45. Otherwise, the flow proceeds to step 46. In this embodiment, the accumulated distance (d) is calculated in terms of a number of pixel pitches of the interface 11 (a pixel pitch is a unit distance between two horizontally/vertically adjacent pixels of the interface 11), and the predetermined distance (D) may be 10 pixel pitches.

It is worth noting that, in some embodiments, the interface 11 may be configured to enable a scaling operation associated with the hand drawing track 3. That is to say, the hand drawing track 3 displayed on the interface 11 may be controlled by the user to be larger or smaller in scale by a scale factor. For example, a scale factor of 200% indicates that the hand drawing track 3 becomes twice as large with respect to the pixels of the interface 11.

When it is determined that the scaling operation is enabled, in step 44, the predetermined distance (D) is adjusted according to the scale factor by which the hand drawing track 3 is scaled. For example, the 10-pixel-pitch predetermined distance (D) may be adjusted to 20 pixel pitches in response to a scaling operation with a scale factor of 200%.

In step 45, the processor 12 marks the current dot ($P_k$) as a reference point 31. Furthermore, the processor 12 resets the accumulated distance (d) to zero.

In step 46, the processor 12 determines whether the current dot ($P_k$) is a penultimate one of the dots ($P_{n-1}$). When it is determined that the current dot ($P_k$) is a penultimate one of the dots ($P_{n-1}$), it can be deduced that all dots of the hand drawing track 3 are processed, and the flow proceeds to step 48.

Otherwise, the flow proceeds to step 47, in which a next one of the dots ($P_{k+1}$) is selected as the current dot, and the flow goes back to step 43.

In the example shown in FIG. 5, the included angle $\theta_k$ is 47 degrees, and the predetermined, angle $\theta_0$ is 45 degrees. As a result, after step 43, the flow proceeds to step 45, in which the current dot ($P_k$) is marked as a reference point 31.

Figure 6:
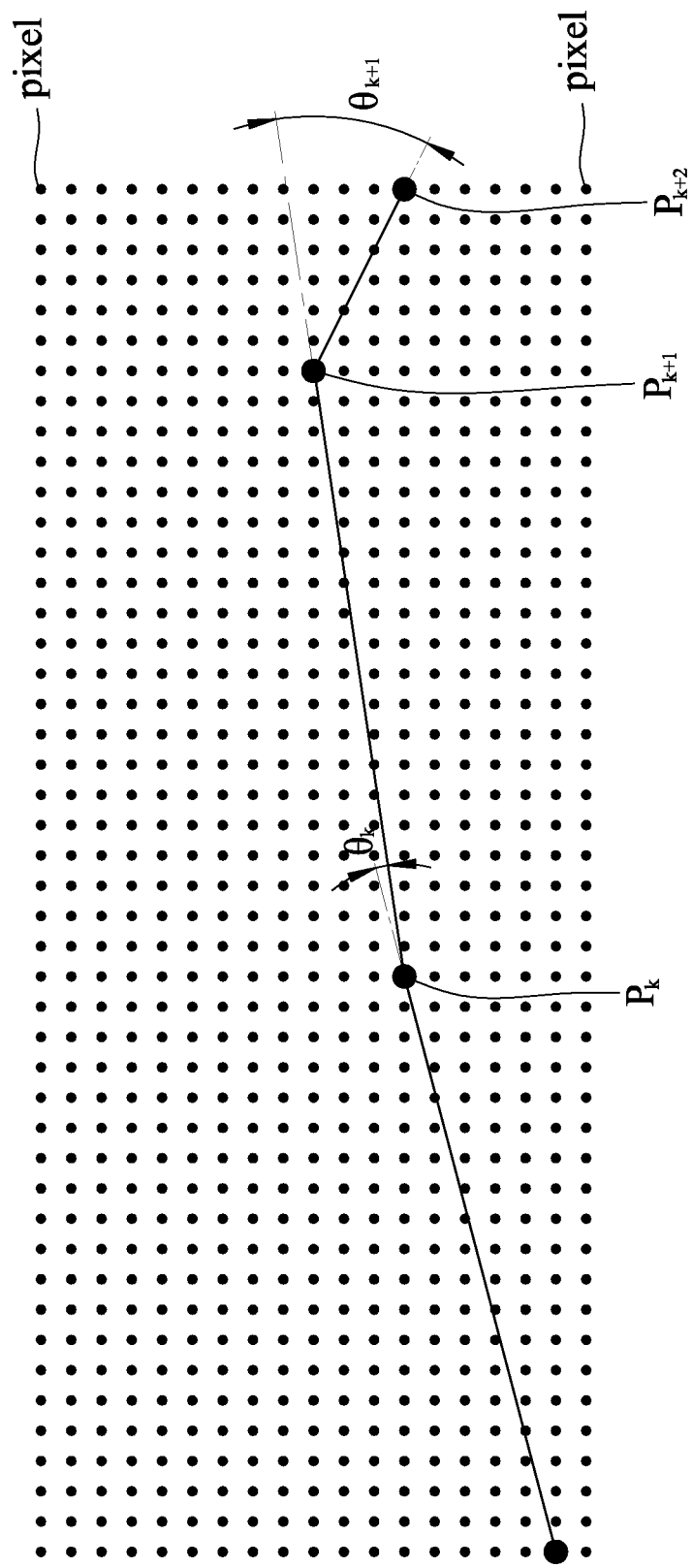

In another example shown in FIG. 6, the included angle $\theta_k$ is found to be 15 degrees in step 43, resulting in the current dot ($P_k$) not being marked as a reference point 31, and the flow proceeds to step 44 after step 43. In step 44, it is determined that the accumulated distance (d) between the current dot ($P_k$) and the previous reference point 31 (denoted as ($d_k$) in FIG. 6) is not larger than the predetermined distance (D), which is set for example at 20 pixel pitches. As a result, the flow proceeds to step 46. When it is determined that the current dot ($P_k$) is not the penultimate one of the dot ($P_{n-1}$) in step 46, the flow proceeds to steps 47 and 43.

In step 43 with the new current dot ($P_{k+1}$) the angle $\theta_{k+1}$ is found to be 15 degrees, and the flow proceeds to step 44, in which the accumulated distance (d) (denoted as ($d_{k+1}$) in FIG. 6) is found to be larger than the predetermined distance (D). As a result, the new current dot ($P_{k+1}$) is marked as a reference point 31, regardless of magnitude of the included angle $\theta_{k+1}$.

Steps 43 to 47 are then repeated until it is determined that the current dot is the penultimate one of the dots ($P_{n-1}$).

In that case, the flow proceeds to step 48, in which the ($n^{th}$) one of the dots ($P_n$), which is it ($P_{37}$) in the example depicted in FIG. 4, is marked as a reference point, and the processor 12 generates information associated with the reference points 31 thus marked. The information enables the sewing machine 2 to sew a pattern according to the reference points 31.

Figure 7:
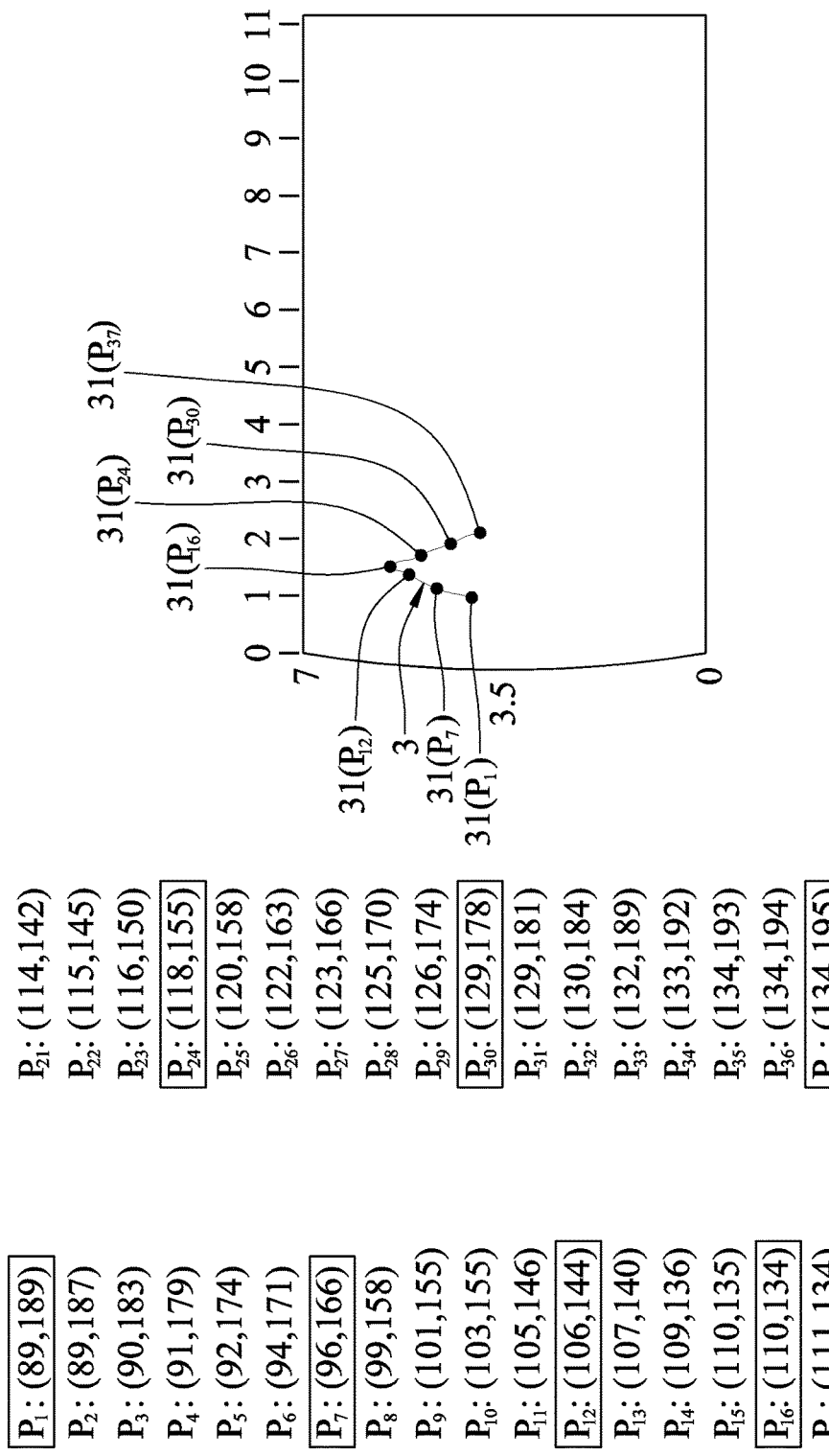
FIG. 7 illustrates the hand drawing track of FIG. 4, with the plurality of reference points being identified.

Specifically, as shown in FIG. 7, in this embodiment, the processor 12 converts the two-dimensional coordinates of each of the reference points 31 (those dots boxed in the list on the left of FIG. 7) into stitch position coordinates readable by the sewing machine 2 to serve as the information associated with the reference points 31.

Afterward, in step 49, the processor 12 controls the communication unit 13 to output the stitch position coordinates to the sewing machine 2.

Figure 8:
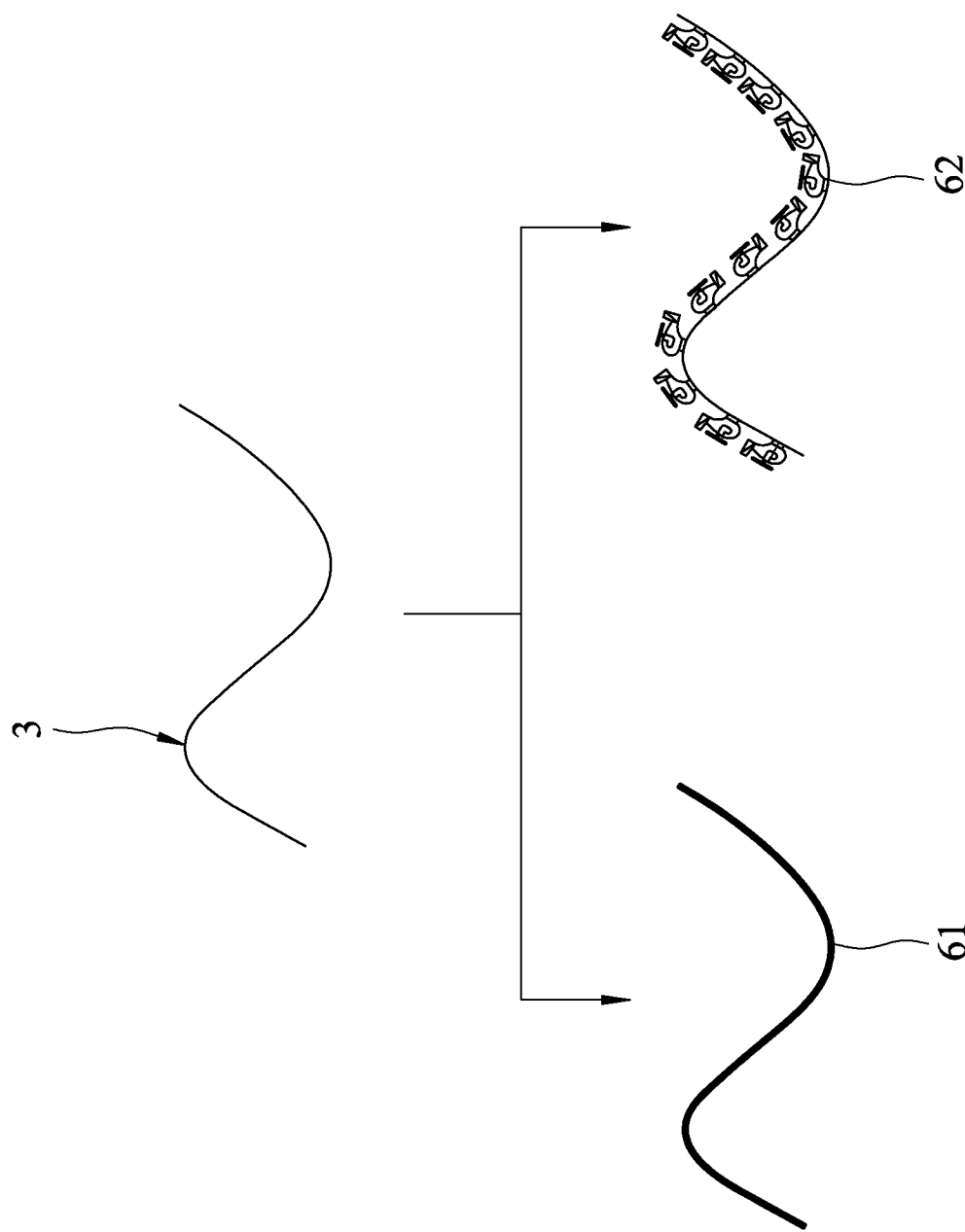
FIG. 8 illustrates the hand drawing track being converted to a pattern that can be sewn by the sewing machine.

In this manner, a hand drawing track 3 drawn by the user on the interface 11 may be utilized by the sewing machine 2 to sew a pattern 61, 62 based on the stitch position coordinates, as shown in FIG. 8.

It should be appreciated that if the included angle associated with the current dot is defined to be included by the line segment interconnecting the current dot and the previous dot, and the line segment interconnecting the current dot and the subsequent dot, then step 43 would be changed to making a determination as to whether the included angle is smaller than a predefined angle.

To sum up, the system 1 and the method as described in the embodiments above provide a relatively convenient way for a user to design a customized pattern that is to be utilized by the sewing machine 2 (by drawing on the interface 11). It is also noted that the mechanism employed by the system 1 to identify the reference points 31 is relatively efficient. As a result, the system 1 and the method may allow more people without the skills to operate sophisticated design software and/or electronic devices to design a customized pattern.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to arrangements.

What is claimed is:

1. A method for identifying a plurality of reference points in a hand drawing track, the method to be implemented using a system including an interface and a processor, the interface being configured for input of the hand drawing track and for display of the hand drawing track with a number (n) of dots, the system being configured to communicate with a sewing machine, the method comprising:

determining, by the processor, a first one of the dots and an (nth) one of the dots of the hand drawing track, and marking the first one of the dots as a reference point;

for each of a (kth) one of the dots of the hand drawing track, determining, by the processor, a first auxiliary line which is an extension of a line segment interconnecting a (k−1th) one of the dots and the (kth) one of the dots, a second auxiliary line which is a line segment interconnecting the (kth) one of the dots and a (k+1th) one of the dots, and an included angle that is associated with the (kth) one of the dots and that is defined by the first and second auxiliary lines, where 2≤k≤(n−1);

marking, by the processor, the (kth) one of the dots as a reference point when the included angle associated with the (kth) one of the dots is larger than a predetermined angle;

calculating, by the processor, an accumulated distance between the (kth) one of the dots and a last one of the reference point(s) thus marked when the included angle associated with the (kth) one of the dots is not larger than the predetermined angle;

by the processor, comparing the accumulated distance thus calculated with a predetermined distance, and marking the (kth) one of the dots as a reference point when it is determined that the accumulated distance thus calculated is larger than the predetermined distance;

by the processor, marking the (nth) one of the dots as a reference point; and outputting, by the system, information associated with the reference points thus marked to the sewing machine, the information outputted by the system enabling the sewing machine to sew a pattern according to the reference points.

2. The method of claim 1, wherein the step of calculating an accumulated distance includes calculating the accumulated distance between the (kth) one of the dots and the last one of the reference point(s) thus marked in terms of a number of pixel pitches.

3. The method of claim 2, the interface being configured to enable a scaling operation associated with the hand drawing track, wherein, in the step of comparing the accumulated distance thus calculated with a predetermined distance, the predetermined distance is adjusted according to a scale factor by which the hand drawing track is scaled.

4. The method of claim 1, further comprising the step of determining, by the processor, two-dimensional coordinates of each of the number (n) of dots according to a coordinate system associated with the interface;

wherein the step of outputting information associated with the reference points includes converting, by the processor, the two-dimensional coordinates of each of the reference points into stitch position coordinates readable by the sewing machine to serve as the information associated with the reference points before outputting the stitch position coordinates to the sewing machine.

5. The method of claim 1, wherein the predetermined angle ranges from 30 degrees to 60 degrees.

6. A system for identifying a plurality of reference points in a hand drawing track, said system comprising:

an interface configured for input of the hand drawing track and for display of the hand drawing track with a number (n) of dots; and a processor coupled to said interface and programmed to determine a first one of the dots and an (nth) one of the dots of the hand drawing track, and mark the first one of the dots as a reference point, for each of a (kth) one of the dots of the hand drawing track, determine a first auxiliary line which is an extension of a line segment interconnecting a (k−1th) one of the dots and the (kth) one of the dots, a second auxiliary line which is a line segment interconnecting the (kth) one of the dots and a (k+1th) one of the dots, and an included angle that is associated with the (kth) one of the dots and that is defined by the first and second auxiliary lines, where 2≤k≤(n−1), mark the (kth) one of the dots as a reference point when the included angle associated with the (kth) one of the dots is larger than a predetermined angle, calculate an accumulated distance between the (kth) one of the dots and a last one of the reference point(s) thus marked when the included angle associated with the (kth) one of the dots is not larger than the predetermined angle, compare the accumulated distance thus calculated with a predetermined distance, and mark the (kth) one of the dots as a reference point when it is determined that the accumulated distance thus calculated is larger than the predetermined distance, and mark the (nth) one of the dots as a reference point; and a communication unit configured to communicate with a sewing machine, and to output information associated with the reference points thus marked to the sewing machine, the information outputted by the system enabling the sewing machine to sew a pattern according to the reference points.

7. The system of claim 6, wherein the accumulated distance is calculated by said processor in terms of a number of pixel pitches of said interface.

8. The system of claim 7, wherein said interface is configured to enable a scaling operation associated with the hand drawing track, and when compared with the accumulated distance, the predetermined distance is adjusted according to a scale factor by which the hand drawing track is scaled.

9. The system of claim 6, wherein said processor is further programmed to determine two-dimensional coordinates of each of the number (n) of dots according to a coordinate system associated with said interface, and to convert the two-dimensional coordinates of each of the reference points into stitch position coordinates readable by the sewing machine to serve as the information associated with the reference points before outputting the stitch position coordinates to the sewing machine.

10. The system of claim 6, wherein the predetermined angle ranges from 30 degrees to 60 degrees.

11. The system of claim 6, wherein said interface includes a touch screen.

12. The system of claim 6, wherein said interface includes a graphics tablet for receiving input of the hand drawing track, and a display for displaying the hand drawing track.

\* \* \* \* \*